US005666871A

United States Patent [19]
Burrows et al.

[11] Patent Number: 5,666,871
[45] Date of Patent: Sep. 16, 1997

[54] SAW CHAIN CUTTER WITH BENT OVER DEPTH GAUGE

[75] Inventors: James O. Burrows, Milwaukie; Randall D. Jensen, Oregon Ctiy; Kent L. Huntington, Molalla, all of Oreg.

[73] Assignee: Blount, Inc., Montgomery, Ala.

[21] Appl. No.: 338,344

[22] Filed: Nov. 14, 1994

[51] Int. Cl.⁶ .................................................. B27B 33/14
[52] U.S. Cl. .............................. 83/834; 83/830; 83/846
[58] Field of Search ............................. 83/834, 846, 835, 83/837, 850–854, 831–833

[56] References Cited

U.S. PATENT DOCUMENTS

| | | |
|---|---|---|
| 2,947,331 | 8/1960 | Irgens . |
| 4,348,927 | 9/1982 | Olmr . |
| 4,590,836 | 5/1986 | Doiron . |
| 4,625,610 | 12/1986 | Petrovich ............................. 83/834 |
| 4,813,323 | 3/1989 | Harfst ................................... 83/834 |
| 4,911,050 | 3/1990 | Nitschmann . |
| 4,989,489 | 2/1991 | Pinney . |
| 5,085,113 | 2/1992 | Pinney . |
| 5,165,318 | 11/1992 | Wesley ................................ 83/834 |

FOREIGN PATENT DOCUMENTS

| | | | |
|---|---|---|---|
| 903642 | 6/1972 | Canada ........................... 83/834 |
| 20418 | 12/1960 | Germany . | |
| 44099 | 2/1961 | Poland ............................ 83/834 |

Primary Examiner—Maurina T. Rachuba
Attorney, Agent, or Firm—Klarquist Sparkman Campbell Leigh & Whinston LLP

[57] ABSTRACT

A cutter for an endless cutter device having a body portion disposed in a substantially upright plane, a cutter portion on a rearward region of the body and a depth gauge portion on a forward region of the body. The depth gauge has a downwardly sloping planar upper surface with a multi-angular configuration. A rear edge of the depth gauge has a central portion which is highest and farther to the rear, with side portions extending forwardly and downwardly therefrom in diverging directions. A free outer edge intermediate the rear edge and forward edge of the depth gauge is the maximum width portion of the depth gauge. Converging edges progress forwardly from the maximum width portion to the front edge of the depth gauge. The heel of the body portion is clipped to permit limited rearward rocking of the cutter.

25 Claims, 3 Drawing Sheets

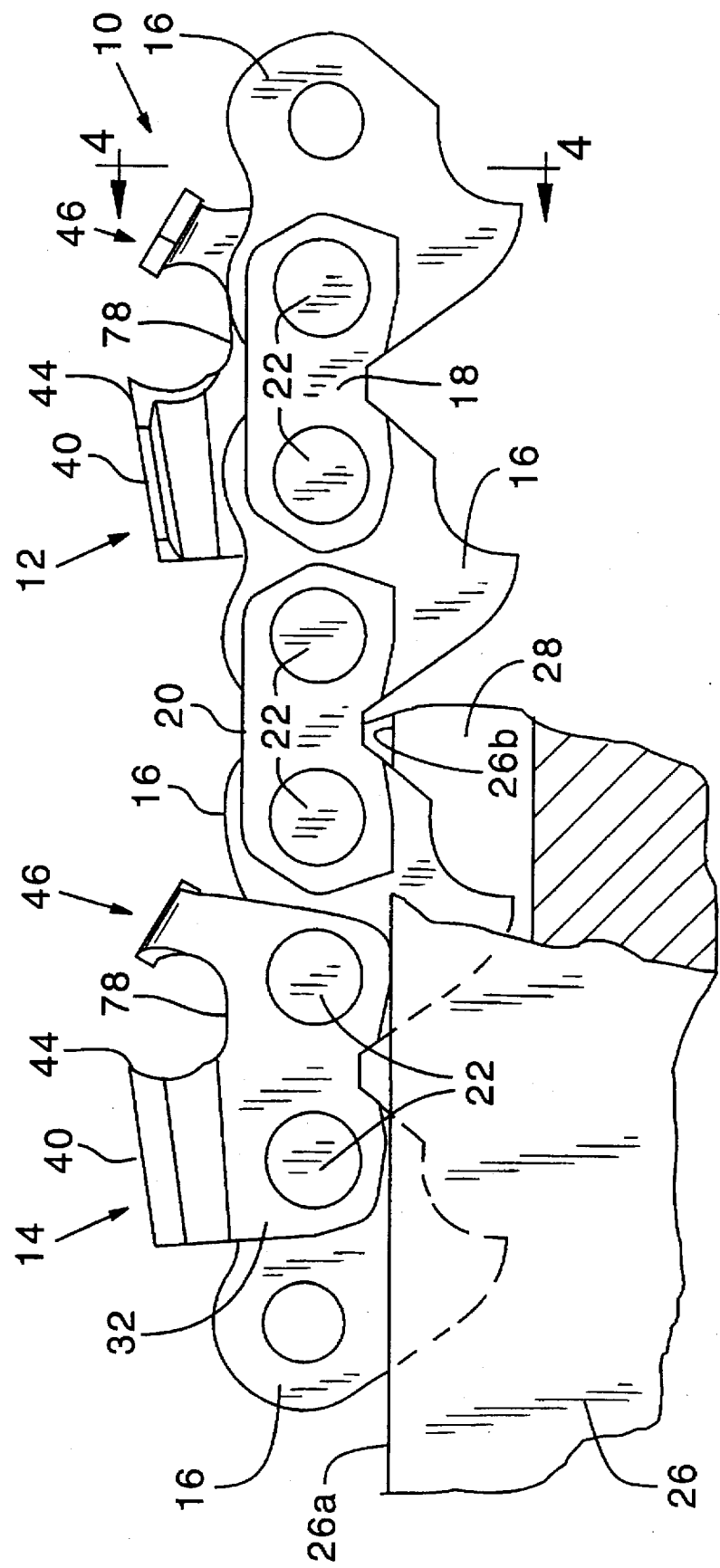

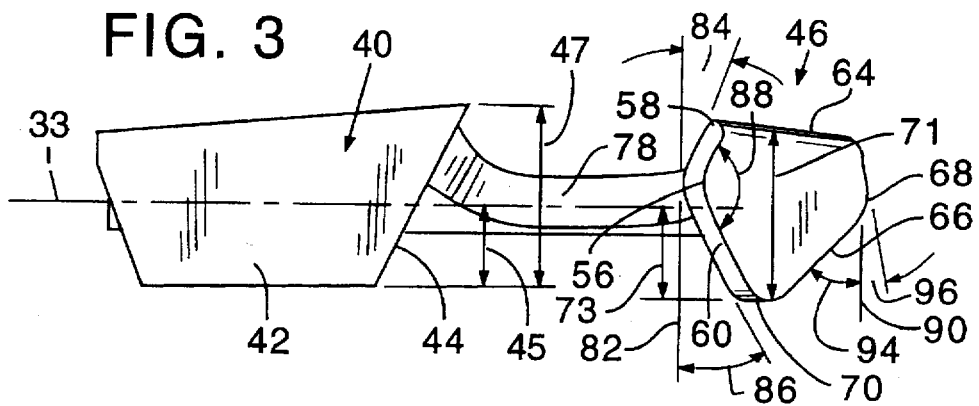
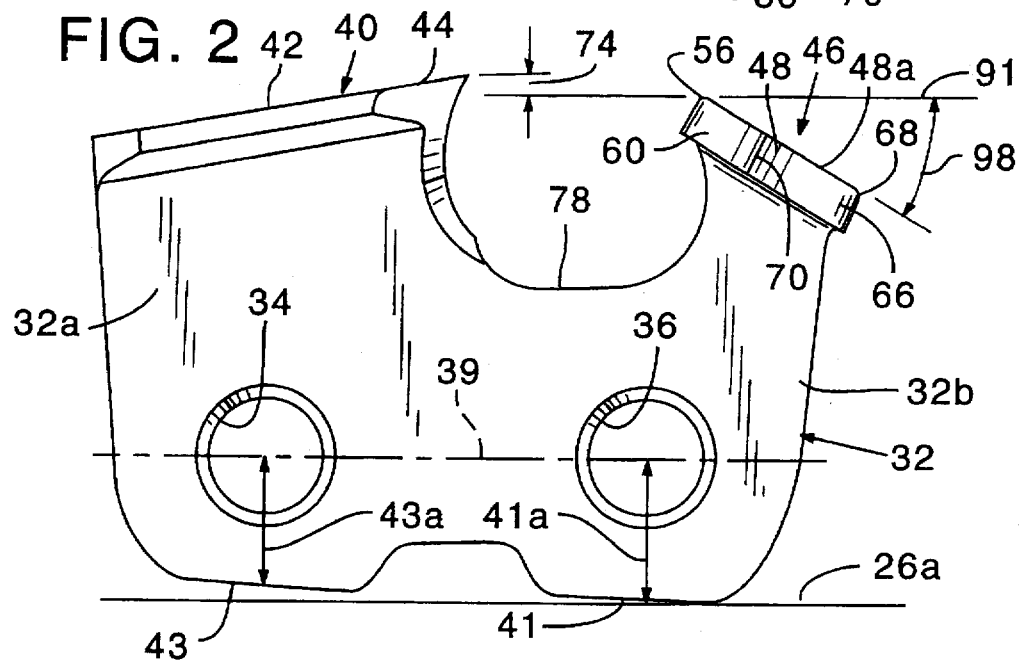
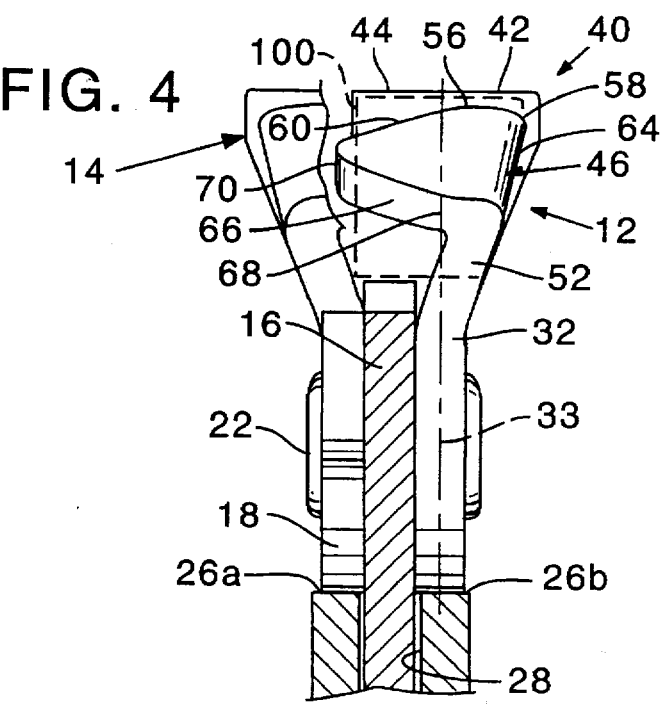

SAW CHAIN CUTTER WITH BENT OVER DEPTH GAUGE

BACKGROUND AND SUMMARY OF THE INVENTION

The present invention relates to an improved cutter, and more particularly to a cutter which has an improved depth gauge.

Cutters for endless cutter devices movable along a path for cutting a kerf in a work piece, such as may be found in a saw chain for cutting wood, generally have a cutter portion with a leading cutting edge and a depth gauge portion spaced forwardly of the cutting edge to control the depth of cut taken by the cutter. The depth gauge is instrumental in reducing the possibility of kickback during operation of the saw on which the chain runs.

Depth gauges in the past generally have included a single thickness of cutter material which extends upwardly in a region spaced forwardly from the cutter edge as disclosed in Silvon U.S. Pat. No. 4,353,277. Others have included bent-over depth gauge portions such as disclosed in U.S. Pat. Nos. 5,085,113 and 4,989,489 to Pinney, U.S. Pat. No. 4,911,050 to Nitschmann and U.S. Pat. No. 4,841,825 to Martin.

The single thickness upright depth gauge as illustrated in U.S. Pat. No. 4,353,277 may have a tendency to dig into the work piece and not provide consistent cutting depth control. Further it is less stable than a bent-over depth gauge. The bent-over depth gauges illustrated in U.S. Pat. Nos. 4,911,050; 4,989,489; and 5,085,113 generally have substantially rectangular configurations as viewed in plan. The depth gauge of U.S. Pat. No. 4,841,825 wraps over the majority of the chain width and substantially encloses the space leading the cutter edge. Although these prior devices produce depth of cut control, they can produce excessive friction and drag and also inhibit the free flow of chips produced by the cutters. Explaining further, if chips produced by the cutter are not allowed to flow easily under the top plate of the cutter they will continue to build up in the kerf, and the depth gauge and cutter will tend to ride thereover producing inefficient cutting.

An object of the present invention is to provide a cutter having a novel depth gauge leading a cutter edge which overcomes the disadvantages of prior devices.

More specifically, an object of the present invention is to provide a cutter having a bent-over depth gauge leading a cutting edge, which depth gauge has a rear edge with a central portion nearest the cutting edge of the cutter and at least one side portion which extends forwardly and downwardly from the central portion at an angle relative to the center line of the cutter. This provides good stability, depth of cut control, and kickback control while permitting free flow of chips to clear the kerf cut in the work piece.

Another object is to provide such a novel cutter with a bent-over depth gauge in which the rear edge has a central portion nearest the cutting edge and side portions which extend forwardly and downwardly from the central portion, diverging from each other as they progress forwardly.

More specifically an object of the present invention is to provide such a novel cutter having a depth gauge with a narrow central portion at its rear edge which is at the greatest elevation for the depth gauge, with remainder portions of the depth gauge sloping downwardly therefrom on progressing forwardly in the cutter.

Still another object of the present invention is to provide a cutter with a novel bent-over depth gauge which has a minimum width at its greatest elevation, and on progressing forwardly and downwardly from such minimum width portion has a central region of maximum depth gauge width intermediate its rear and front edges, thus to provide good depth gauge control, cutter stability, free chip flow, and reduction of friction and drag on the cutter as it moves through the kerf in the work piece.

Yet another object is to provide a novel cutter for use in an articulated cutter chain having a clipped heel on the underside of the cutter and a bent-over depth gauge which will cooperate to assist in stabilizing the chain and minimize vibration during use of the chain.

In prior cutting devices, as with the present device, as the cutting portion is sharpened, such usually occurs from the front of the cutter which increases the size of the gullet space between the cutter edge and the depth gauge. In past cutters, it has been found that increasing the distance between the depth gauge and the cutting edge often has increased kickback potential of the cutters. It has been found that the present invention and configuration of the depth gauge therefor maintains a greater degree of kickback control as sharpening occurs, thus resisting the tendency of prior devices to increase kickback through cutter life.

Yet another object of the present invention is to provide a cutter having such a novel depth gauge which has a maximum width that is at least as great or greater than the width of the cutter top plate and cutting edge to lend additional stability to the cutter during operation.

BRIEF DESCRIPTION OF THE DRAWINGS

FIG. 1 is a side elevation view of a section of a saw chain incorporating cutters according to an embodiment of the invention;

FIG. 2 is an enlarged side elevation view of a cutter link removed from the chain of FIG. 1;

FIG. 3 is a top plan view of the cutter of FIG. 2;

FIG. 4 is an enlarged front elevation view of the cutter taken along the line 4—4 in FIG. 1 as it would be attached to other links in the chain;

DESCRIPTION OF A PREFERRED EMBODIMENT

Figure 5:
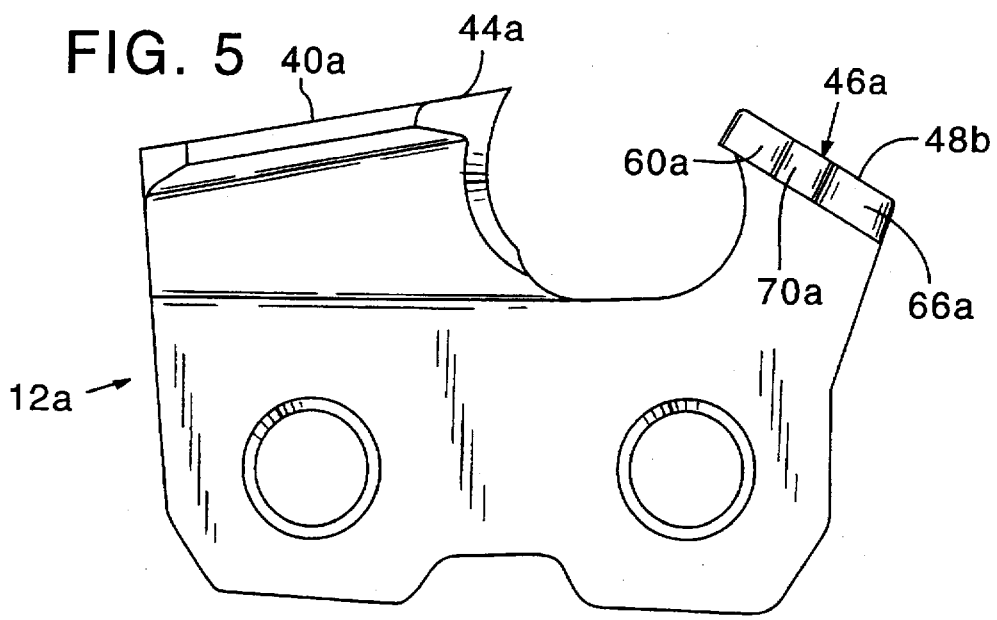
FIG. 5 is an enlarged side elevation view of a second embodiment of a cutter link removed from a chain as shown in FIG. 1.

Referring to the drawings, and first more particularly to FIG. 1, at 10 is indicated generally a section of a cutter chain for use with a chain saw. The chain includes left and right hand cutter links 12, 14, center drive links 16 and connector links 18, 20. All of these links have bores extending therethrough adjacent opposite ends. Rivets 22, acting as pivot pins, extend through aligned bores in the links to pivotally interconnect the cutter, drive, and connector links together.

The chain is supported for travel on a guide bar, a portion of which is indicated at 26 having a groove 28 in which depending tang portions of drive links 16 slidably move. The undersides of the cutter links and connector links ride slidably along supporting guide rails 26a, 26b at opposite sides of groove 28.

Referring to FIGS. 2, 3 and 4, a left-hand cutter link 12 is illustrated in enlarged form to illustrate an embodiment of the present invention. The cutter, or cutter link, 12 includes a substantially planar upright body portion 32 having a center plane noted generally at 33. A pair of spaced apart rivet receiving bores 34, 36 extend through the rear, or heel, region 32a and the front, or toe, region 32b, respectively, of body 32. The centers of bores 34, 36 are aligned on a center line 39 which is generally parallel to the guide rails 26a, 26b on which the chain runs.

As is best seen in FIG. 2 the underside 41 of the cutter body under bore 36 in the toe region adjacent the front of the cutter is spaced a selected distance 41a beneath the center of bore 36. The underside 43 of the cutter body under the center of bore 34 is clipped so that it angles upwardly on progressing to the rear at an angle of 1½° to 5° relative to centerline 39. The distance 43a to the underside of portion 43 from the center of bore 34 is less than distance 41a, preferably in a range of 0.01 to 0.08 inch. This distance will vary in relation to the size and style of cutter.

The rear end region 32a of the body has a cutter portion 40 thereon. The cutter portion includes a cutter top plate portion 42 and a forwardly facing cutting edge 44. The cutter top plate portion is bent over at substantially a right angle relative to and overlies body portion 32 of the cutter. The cutting edge 44 extends transversely of the plane of the body portion and overlies the body portion.

The cutting edge 44 is spaced a selected elevation above the body portion for cutting purposes. The free outer end of the cutting edge 44 is spaced a distance 45 from the center plane 33 of the body portion.

A depth gauge portion 46 is mounted on the front end region 32b of the body portion. The depth gauge portion includes a plate portion 48 which is bent over at a substantial angle relative to the plane of the body portion and has a substantially planar upper surface 48a which is inclined continuously downwardly on progressing forwardly in the cutter. The depth gauge portion in the illustrated cutter is bent over at substantially a right angle relative to the plane of the body portion and overlies the body portion. As is best seen in FIG. 4 a juncture section 52 disposed at a slight angle relative to the plane of body portion 32 interconnects the body portion and depth gauge portion and the depth gauge is cantilevered outwardly therefrom with a free outer edge.

Referring to FIG. 3, it will be seen that the depth gauge plate portion 48 is multi-angular, and in this embodiment is substantially pentagonal. The rearwardly facing rear edge of the plate portion 48 has a central portion 56 nearest cutting edge 44. The rear edge has opposed side portions 58, 60 which in the illustrated embodiment extend forwardly from central portion 56 and diverge from each other on progressing forwardly from the central portion. As is seen in FIG. 3, the central portion 56 is formed by the juncture of side portions 58, 60, is substantially a convex curve, and has a width which is a minor portion of the overall width of the depth gauge. The side portion 58 could extend perpendicular to center plane 33 from central portion 56, if desired, with side portion 60 alone extending forwardly and downwardly from the central portion. However, it is believed that operational benefits occur by having both sides 58, 60 angled forwardly from the central portion.

Referring to FIGS. 3 and 4, cutting edge 44 has a defined width 47 extending laterally, or transversely, of the cutter, and central portion 56 of the rear edge of the depth gauge is disposed intermediate, and here substantially centrally of, opposite ends of the cutting edge.

As side portions 58, 60 extend forwardly from central portion 56, not only do they diverge from each other but they also slope downwardly from central portion 56. Thus, central portion 56 is disposed at the greatest elevation relative to the body portion and nearest the elevation of cutter edge 44. The central portion 56 of the rear edge of the depth gauge is aligned forwardly of an intermediate region of the cutting edge 44.

Extending forwardly from rear edge side portions 58, 60 are opposed side edges 64, 66. These side edges converge toward each other as they progress forwardly from their junctures with side portions 58, 60. They join with opposite ends of front edge 68 which extends substantially laterally of the plane of the body portion.

The juncture between rear edge side portion 60 and side edge 66 is formed in a convexly curved outer edge 70 which is at the region of maximum width for the depth gauge. Since the depth gauge plate portion 48 is joined only along side edge 64 to juncture portion 52, it has a free side region extending away from the body portion which includes rear edge side portion 60 and side edge 66 which converge in the convex curve at central region 70. As is best seen in FIGS. 3 and 4, the maximum width portion 70 of the depth gauge is disposed at an elevation intermediate the highest and lowest portions of the depth gauge, between the front and rear edges of the depth gauge. As seen in FIGS. 3 and 4 in the embodiment illustrated the maximum width 71 of the depth gauge portion is at least as great or greater than the width 47 of the cutter portion 40 following it. Further, the outer edge 70 of the depth gauge projects a distance 73 laterally of central plane 33 which is greater than the distance 45 for cutter edge 44.

Referring to FIG. 4, a right-hand cutter 14 is illustrated which follows cutter 12 in the chain as shown in FIG. 1. A major portion of the top plate of the cutter 14 and its depth gauge are broken away so that they do not interfere with illustration of the major portions of cutter 12. However, it will be seen that central region 70 of depth gauge 46 in the embodiment of cutter 12 illustrated extends outwardly beyond the width of top plate 44 toward the side of the kerf which would be cut by the side cutting edge of cutter 14. Such extension of the depth gauge toward the opposite side of the chain has been found to improve chain stability during cutting.

In FIG. 2 distance 74 denotes the elevational distance that the uppermost portion of depth gauge 46 is spaced below the uppermost edge of cutting edge 44. This is known generally as the depth gauge setting for the cutter.

Referring still to FIG. 2, depth gauge 46 is spaced a distance forwardly of cutter portion 40 to provide an open gullet space 78 therebetween.

Various angular relationships between the sides, or edges, of the depth gauge are illustrated in FIG. 3. A line 82 is drawn extending normal to the central plane of the cutter body. Angles 84 and 86 denote the orientations of rear edge side portions 58, 60, respectively, relative to line 82. An included angle 88 is defined between rear edge side portions 58, 60. Another line 90 is drawn extending normal to the central plane of the cutter adjacent the forward end of the depth gauge. Angles 94, 96 denote the orientations of side edge 66 and front edge 68, relative to line 90.

An exemplary cutter will now be described having a pitch distance between the center of bores 34, 36 of approximately 0.390 inch, and an overall height of approximately 0.520 inch, depth gauge setting distance 74 may be in a range of 0.015 to 0.030 inch. The following sizes, angles and distances are measured along a horizontal plane, indicated generally at 91 in FIG. 2, and as viewed in plan in FIG. 3. Depth gauge portion 46 may have an overall length of approximately 0.175–0.30 inch. Outer edge 70 of the depth gauge would be in a range of 0.050 to 0.150 inch forwardly of rear edge central portion 56. Angle 84 may be in a range of 0° to 30° (preferably 10° to 30°), angle 86 in a range of 10° to 40°, and included angle 88 in a range of 110°–170°, and preferably 110° to 160°. Angle 94 is in a range of 10°–55° and angle 96 in a range of 0° to 15°. The downward slope 98 of the upper planar surface 48a as shown in FIG. 2 is in a range of 25° to 35°.

Referring to FIG. 4, a dashed line 100 illustrates generally the outline of substantially rectangular depth gauges of prior art devices. Such have not permitted free flow of cut chips to pass easily into the gullet region and under the top plate 42 of the cutter. This inability to free the kerf of debris has resulted in vibration, excessive friction, and other impediments to efficient cutting.

The configuration of the present invention with a depth gauge portion which has angularly disposed sides 58, 60 and a central region 56 at its greatest elevation intermediate the width of the cutter edge permits free flow of chips past the depth gauge rear edge side portions so that debris flows freely into the gullet region and under the cutter top plate toward the chassis of the chain. This free flow of chips is further enhanced by the positioning of the side edges and front edge. Further, friction is minimized by minimizing the amount of the depth gauge which engages the kerf and debris within the kerf.

It will be seen that central portion 56 is the highest and rearwardmost portion of the depth gauge and that remainder portions of the depth gauge incline downwardly and forwardly therefrom.

Although the bent-over depth gauge is described here on a cutter with a clipped heel, it should be recognized that the depth gauge configuration can be used in cutters without a clipped heel. The depth gauge of the present invention provides many operational benefits independently of, as well as in conjunction with, a clipped heel configuration.

Figure 6:
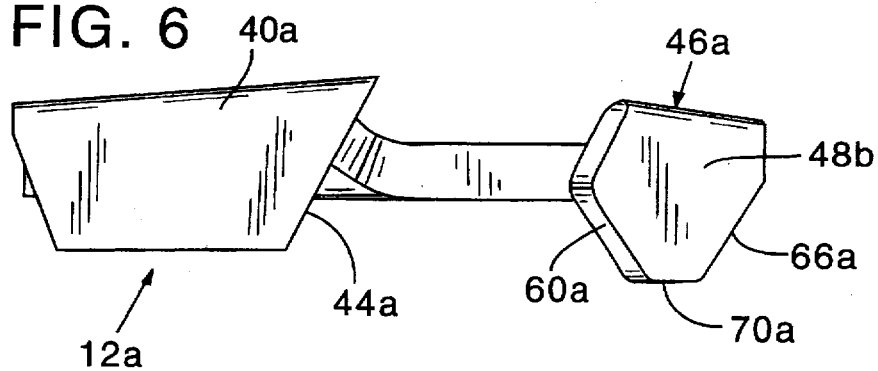
FIG. 6 is a top plan view of the cutter of FIG. 5.
Figure 7:
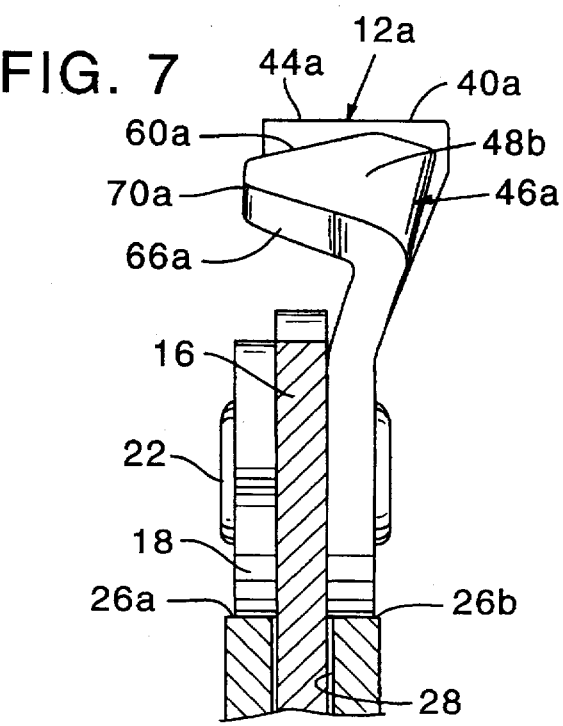
FIG. 7 is an enlarged front elevation view of the cutter of FIG. 5 taken along a line similar to the line 4—4 shown in FIG. 1 illustrating the cutter as it would be attached to other links in the chain.

FIGS. 5–7 illustrate another embodiment of the invention. A cutter 12a is illustrated having a cutter portion 40a with a forwardly facing cutting edge 44a.

A depth gauge portion 46a is mounted on the front end of the body portion of the cutter and is bent over at a substantial angle relative to the plane of the body portion. It has a substantially planar upper surface 48b which is inclined downwardly on progressing forwardly in the cutter.

The depth gauge portion 46a illustrated in FIGS. 5–7 is multi-angular, and in this embodiment is substantially hexagonal.

The configuration of the depth gauge 46a is somewhat similar to that previously described for depth gauge 46, except that in this configuration, rather than having a convexly curved outer edge region 70 between edges 60 and 66, there is a substantially flat side 70a provided between side edges 60a, 66a.

In operation of a saw chain having a cutter constructed as illustrated, as the saw chain is driven forwardly the depth of cut is controlled by depth gauge portion 46 leading cutting edge 44. The depth gauge portion having the configuration illustrated provides effective depth gauge control, chain stability and kickback minimization while permitting chips produced in the kerf of the work piece to flow freely past the depth gauge and into the chassis region of the chain underlying the bent-over cutter portion 42 of the cutter.

Further, with the clipped heel portion of the cutter, and a connector link on the opposite side with a clipped heel portion paralleling the clipped heel of the cutter as illustrated for link 18 in FIG. 1, such is able to rock rearwardly in the articulated chain to reduce vibration. When this occurs the effective depth gauge setting 74 is reduced to reduce vibration in the chain. The configuration of the bent-over depth gauge acts in conjunction with the clipped heel portion to provide lateral stability in the chain should such rocking occur. Explaining further, previous cutting chains which may have had clipped heel portions have included a generally planar upright depth gauge which produced very narrow contact with the work piece. This could allow rotation of chain parts about the central axis extending longitudinally of the chain. With the present depth gauge configuration, having a width which is major portion of or greater than the width of the cutter, the depth gauge will engage the kerf to provide greater stability, and reduce the tendency of the chain parts to rotate about the central axis of the chain.

The bent-over depth gauge design of the present invention provides sufficient width to produce kickback control for safety, while still producing improved chip flow.

While a preferred embodiment of the invention has been disclosed herein, it will be apparent to those skilled in the art that changes and modifications may be made without departing from the spirit of the invention.

What is claimed is:

1. A cutting chain comprising a plurality of pivotally interconnnected links including cutter links, with a cutter link in said chain in an upright position comprising, a body portion disposed in a substantially upright plane and having forward and rearward regions, a cutter portion on the rearward region of the body portion having a forwardly facing cutting edge at a selected elevation above the body portion, and a depth gauge portion on the forward region of the body portion, said depth gauge portion comprising a plate portion bent over at substantially a right angle relative to the plane of the body portion and having an upper surface inclined substantially continuously downwardly from a rearwardly facing rear edge of the plate portion which is disposed at an elevation adjacent but below the elevation of the cutting edge to a forwardly facing front edge of the plate portion which is disposed at a lower elevation, said depth gauge portion being substantially pentagonal with one side of said pentagonal configuration forming a front edge for the depth gauge, and said rear edge having a central portion nearest said cutting edge and a pair of side portions opposite said front edge which extend forwardly from said central portion and diverge from each other on extending forwardly.

2. The chain of claim 1, wherein said central portion of said rear edge of the depth gauge is disposed at the greatest elevation for the depth gauge relative to said body portion and remainder portions of said depth gauge incline downwardly on extending forwardly therefrom.

3. The chain of claim 2, wherein said diverging side portions are inclined downwardly from said central portion as they extend forwardly therefrom.

4. The chain of claim 3, wherein said depth gauge has a central region intermediate its front and rear edges which has the maximum width for the depth gauge, and said side portions of said rear edge extend from said central portion of the rear edge toward said central region.

5. The chain of claim 4, wherein said depth gauge further comprises opposed side edges which extend forwardly from said central region and converge toward each other as they extend forwardly therefrom.

6. The chain of claim 5, wherein the depth gauge has a free side region extending away from said body portion, and one of said rear edge side portions and one of said side edges converge in a convex curve on said free side region at said central region.

7. The chain of claim 6, wherein the maximum width of said depth gauge occurs at said convex curve.

8. The chain of claim 7, wherein said maximum width portion of said depth gauge is disposed at an elevation intermediate the highest and lowest portions of said depth gauge.

9. The chain of claim 1, wherein said rear edge side portions diverge from each other to provide an included angle therebetween in a range of from 110 to 170 degrees.

10. The chain of claim 1, wherein said rear edge side portions diverge from each other to provide an included angle therebetween in a range of from 110 to 160 degrees.

11. The chain of claim 1, wherein said diverging rear edge side portions are inclined downwardly from said central portion as they progress forwardly therefrom.

12. The chain of claim 1, wherein said central portion of said rear edge of the depth gauge defines a convex curve.

13. A cutter for an endless cutter device movable along a path for cutting a kerf in a workpiece, said cutter in an upright position comprising, a body portion disposed in a substantially upright plane and having forward and rearward regions, a cutter portion on the rearward region of the body portion having a forwardly facing cutting edge at a selected elevation above the body portion, and a depth gauge portion on the forward region of the body portion, said depth gauge portion comprising a plate portion bent over at substantially a right angle relative to the plane of the body portion and having an upper surface inclined substantially continuously downwardly from a rearwardly facing rear edge of the plate portion which is disposed at an elevation adjacent but below the elevation of the cutting edge to a forwardly facing front edge of the plate portion which is disposed at a lower elevation, said depth gauge portion being substantially pentagonal with one side of said pentagonal configuration forming a front edge for the depth gauge, and said rear edge having a central portion nearest said cutting edge and a pair of side portions opposite said front edge which extend forwardly from said central portion and diverge from each other on extending forwardly.

14. The cutter of claim 13, wherein said central portion of said rear edge of the depth gauge is disposed at the greatest elevation for said depth gauge relative to said body portion and remainder portions of said depth gauge incline downwardly on extending forwardly therefrom.

15. The cutter of claim 14, wherein said diverging side portions are inclined downwardly from said central portion as they extend forwardly therefrom.

16. The cutter of claim 15, wherein said depth gauge has a central region intermediate its front and rear edges which has the maximum width for the depth gauge, and said side portions of said rear edge extend from said central portion toward said central region.

17. The cutter of claim 16, wherein the cutting edge has a selected width extending transversely of the plane of the body portion and the maximum width of said depth gauge portion is at least as great as the width of the cutting edge.

18. The cutter of claim 16, wherein said depth gauge further comprises opposed side edges which extend forwardly from said central region and converge toward each other as they extend forwardly therefrom.

19. The cutter of claim 18, wherein the depth gauge has a free side region extending away from said body portion, and one of said rear edge side portions and one of said side edges converge in a convex curve on said free side region at said central region.

20. The cutter of claim 19, wherein the maximum width of said depth gauge occurs at said convex curve.

21. The cutter of claim 20, wherein said maximum width portion of said depth gauge is disposed at an elevation intermediate the highest and lowest portions of said depth gauge.

22. The cutter of claim 13, wherein said rear edge side portions diverge from each other to provide an included angle therebetween in a range of from 110 to 170 degrees.

23. The cutter of claim 13, wherein said rear edge side portions diverge from each other to provide an included angle therebetween in a range of from 110 to 160 degrees.

24. The cutter of claim 13, wherein said diverging rear edge side portions are inclined downwardly from said central portion as they progress forwardly therefrom.

25. The cutter of claim 13, wherein said central portion of said rear edge of the depth gauge defines a convex curve.

* * * * *